United States Patent [19]

Hori et al.

[11] Patent Number: 5,094,098
[45] Date of Patent: Mar. 10, 1992

[54] ROTATABLE SHAFT ASSEMBLY FOR A GEAR REDUCTION MECHANISM

[75] Inventors: Hideya Hori; Mamoru Nakamura; Hiroyuki Amano, all of Aichi, Japan

[73] Assignee: Aisin Seiki K.K., Aichi, Japan

[21] Appl. No.: 415,753

[22] Filed: Oct. 2, 1989

[30] Foreign Application Priority Data

Sep. 30, 1988 [JP] Japan .................. 63-128549

[51] Int. Cl.$^5$ .............................. F16H 3/74
[52] U.S. Cl. ........................ 73/1 E; 74/7 E; 74/497
[58] Field of Search ............ 74/7 E, 391–404, 74/404.5, 405, 406, 411, 412 R, 412 TA, 413, 414, 415, 421 R, 421 A; 73/1 E, 1 D, 2, 162, 865.9

[56] References Cited

U.S. PATENT DOCUMENTS

| | | | |
|---|---|---|---|
| 2,436,746 | 2/1948 | Drought | 74/397 X |
| 3,191,452 | 6/1965 | Lipski et al. | 74/397 X |
| 3,220,276 | 11/1965 | Bruns | 74/397 X |
| 3,344,652 | 10/1967 | Priser | 73/1 E |
| 3,913,377 | 10/1975 | Lindeman | 73/10 |
| 4,050,324 | 9/1977 | Teyssandier | 74/397 |
| 4,307,630 | 12/1981 | Osborn et al. | 384/138 X |
| 4,616,164 | 10/1986 | Kenny et al. | 74/DIG. 10 X |
| 4,645,024 | 2/1987 | Takabayashi | 73/862.68 X |
| 4,671,125 | 6/1987 | Yabunaka | 74/7 E X |
| 4,787,267 | 11/1988 | Kessler et al. | 74/606 R |

FOREIGN PATENT DOCUMENTS 262042 10/1988 Japan .
2126315 3/1984 United Kingdom .................. 74/397

OTHER PUBLICATIONS

*Patent Abstracts of Japan*; vol. 13, No. 81, GRP E719, ABS publication date Feb. 23, 1989 (63–262042).

Primary Examiner—Tom Noland
Attorney, Agent, or Firm—Sughrue, Mion, Zinn, Macpeak & Seas

[57] ABSTRACT

A gear reduction mechanism is provided with a rotatable shaft supported by a pair of spaced apart bearings in a one piece retainer having coaxially aligned holes for receiving said bearings. A potentiometer is supported from the same retainer and is provided with an input axle adjustably connected to the shaft to provide an output signal indicative of the angular position of the shaft. The adjustment may take place through a vent hole in the housing of the mechanism which has a removable filter therein.

1 Claim, 7 Drawing Sheets

ROTATABLE SHAFT ASSEMBLY FOR A GEAR REDUCTION MECHANISM

BACKGROUND OF THE INVENTION

The present invention relates to gear reduction assembly and in particular to a mounting structure for a rotatable shaft on which a gear is fixed.

In gear reduction mechanisms according to the prior art, two bearings are generally used to support a rotatable shaft on which a gear is fixed. One of the two bearings is usually pressed into a retaining hole in a supporting base and another is usually pressed into a retaining hole in the housing. The supporting base is secured on the housing by screws, so that the rotatable shaft is positioned and mounted correctly relative to the housing.

The position and assembling angle of the rotatable shaft relative to the housing is determined according to the relationship of three positions. The first position is that of a retaining hole in the housing; the second position is that of a retaining hole in the base and the third position is the assembly position of the holding base relative to the housing. The machining precision of the first hole and the second hole, that is, the position precision of the first position and the second position, the machining precision of the screw hole of the supporting base and the machining precision of the screw hole of the housing are not precise enough so that eccentricity of the rotatable shaft of the mechanism and non-uniformity of rotation load and backlash will occur. It is clear that problems such as machining precision are present and the procedure of assembly creates more problems. It is an object of the present invention to improve the problems existing in the prior art.

SUMMARY OF THE INVENTION

The present invention relates to a gear reduction mechanism comprising a housing, a gear and a rotatable shaft on which the gear is firmly fixed. The rotatable shaft is mounted by at least two bearings which are pressed into corresponding retainer holes and thus supported by a retainer which is fixed to the housing.

It is easier in a single retainer to make retainer holes for two aligned bearings for a rotatable shaft with great precision. Therefore, the position of the rotatable shaft can be determined by fixing the retainer to the housing. If the fixing of the retainer is correct the position of the rotatable shaft relative to the housing will be absolutely right. In the prior art mechanism, it is necessary to locate three correct positions respectively, whereas in the present invention, the position of the rotatable shaft relative to the housing can be determined essentially by correctly locating only one position, i.e., the position of the retainer relative to the housing.

Since the only thing to be done is that the retainer holding two bearings and the rotatable shaft is fixed on the housing, the assembly of the rotatable shaft relative to the housing is easier than that of the prior art.

DETAILED DESCRIPTION OF A PREFERRED EMBODIMENT

Figure 1:
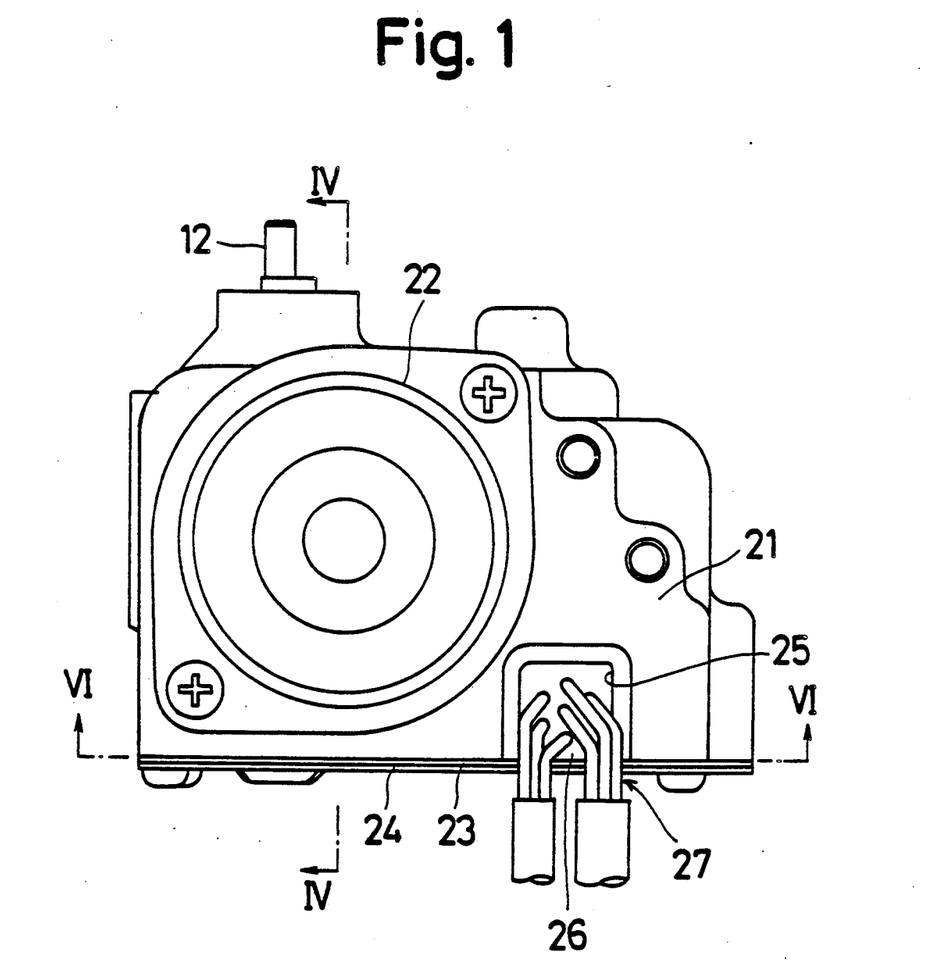
FIG. 1 is a front view of the outer housing of an embodiment of the present invention.

FIG. 1 is a front view of an embodiment of the present invention which is an electrically operated gear reduction mechanism used to automatically control a throttle valve of an internal combustion engine in order to provide a constant running speed for a vehicle. An output axle 12 is connected to the throttle valve and is rotated by a motor.

A motor case 22 is fixed in an airtight manner on a gear housing 21. The opening of the gear housing 21 is sealed by a cover with a peripheral gasket 23. On the side wall of the rim of the opening of the gear housing 21 there is a rectangular opening 25 having a wiring grommet 26 pressed therein. Electrical leads 27 which are connected to a printed circuit substrate 15 (FIG. 3) inside the gear housing 21 extend through the grommet 26.

Figure 2:
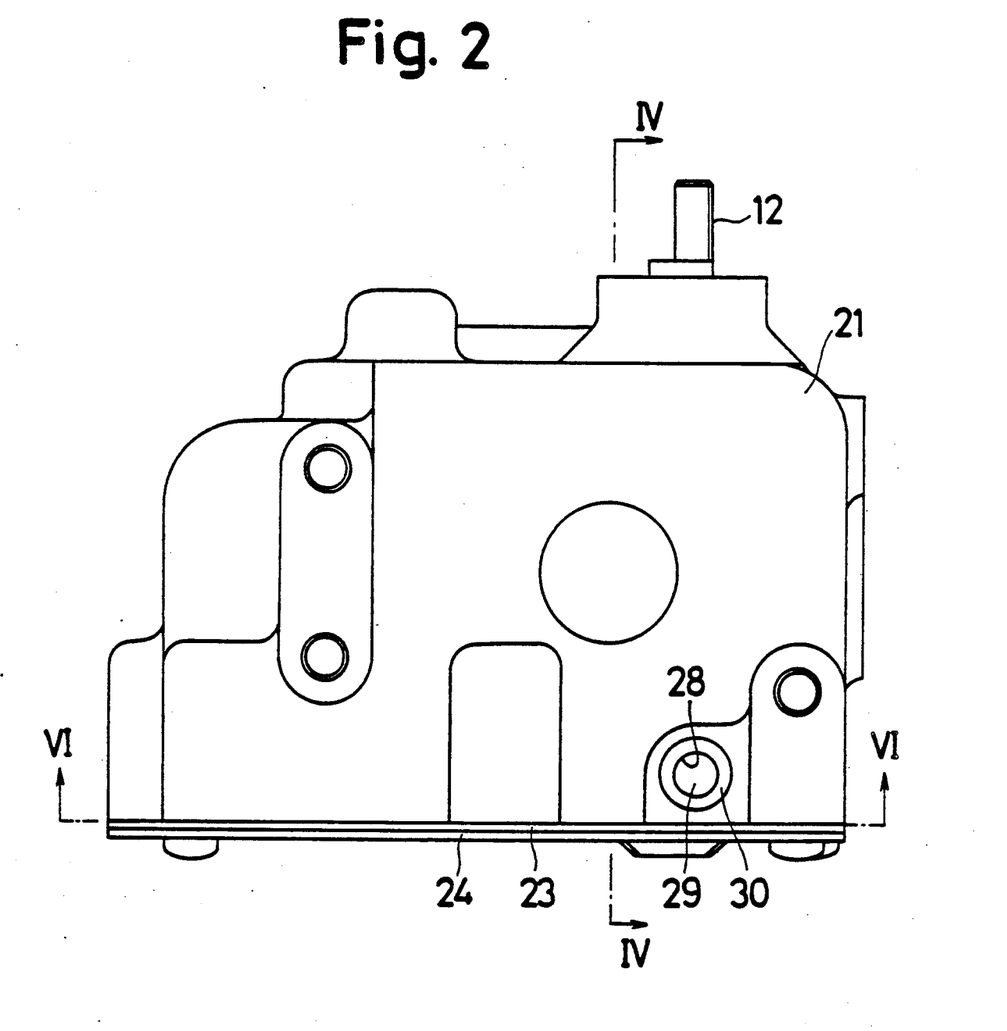
FIG. 2 is a rear view of the outer housing.

FIG. 2 is a rear view of the electrically operated gear reduction mechanism of FIG. 1. On the back of the gear housing 21 a through hole 28 extends from the inside to the outside of the housing. One end of the hole 28 adjacent the inside of the gear housing 21 has a smaller diameter than the other end adjacent the outside. A filter 29 is inserted into the larger diameter portion of the hole 28 to prevent dust and water from coming through. The filter is pressed into the larger diameter part of the hole 28 by a ring 30 pressed from outside of the gear housing 21.

Figure 3:
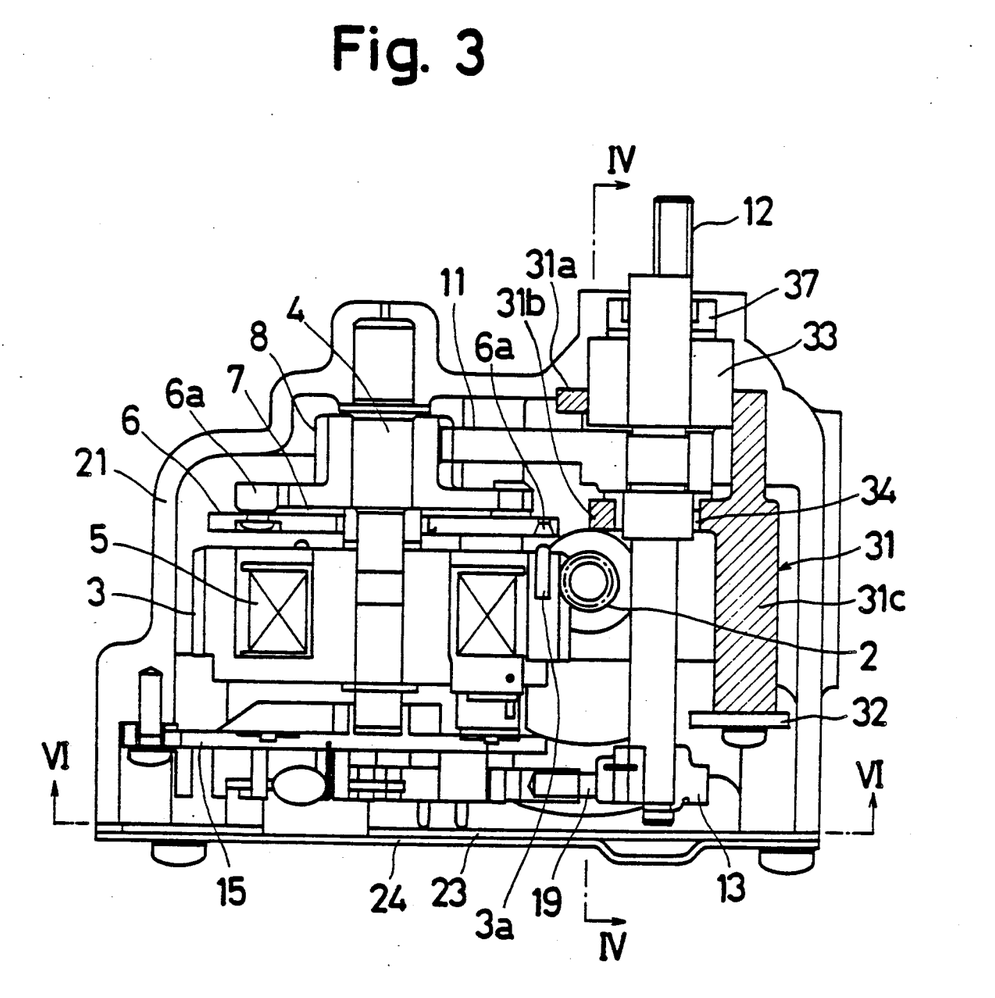
FIG. 3 is a cross-sectional view taken along the output axle 12 shown in FIG. 2 and parallel to the paper surface of FIG. 2.
Figure 4:
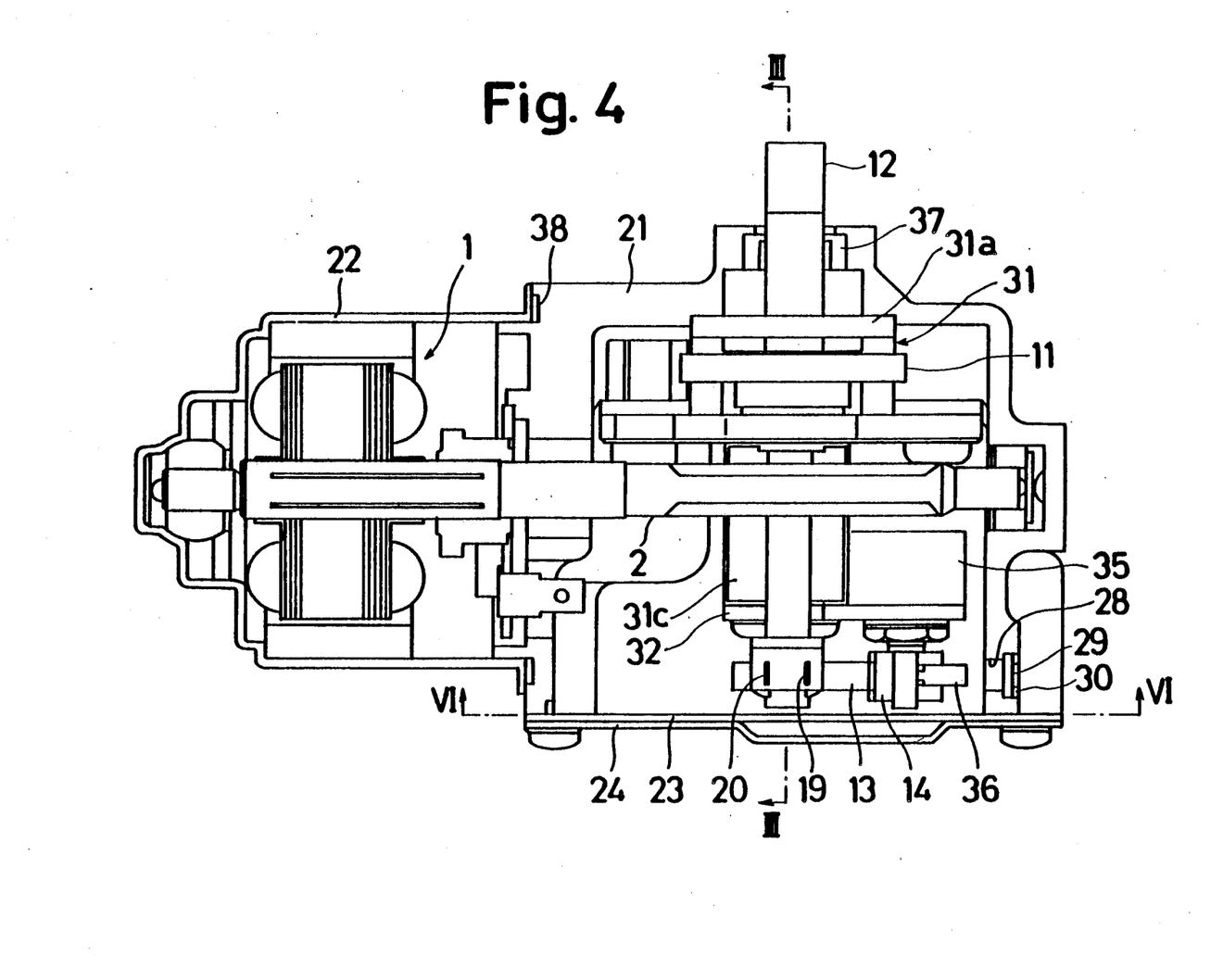
FIG. 4 is a cross-sectional view taken alone line IV—IV in FIG. 1.

FIG. 3 is a cross-sectional view of the electrically operated gear reduction mechanism taken along the output axle and parallel to the paper surface of FIG. 2. FIG. 4 is a cross-section view taken along line IV—IV of FIG. 1.

First, FIG. 4 shows a worm gear 2 combined with the rotatable shaft of the electric motor 1 supported in the motor case 22.

Second, FIG. 3 shows a magnetic clutch driving gear 3 in meshing engagement with the worm 2. The clutch driving gear 3 is supported on a shaft 4 and can freely rotate relative to the shaft 4. If the motor 1 rotates positively the clutch drivign gear 3 rotates positively and conversely, if the motor 1 rotates negatively, the clutch driving gear 3 rotates negatively.

An annular groove is formed in the clutch driving gear 3 and an electric coil 5 is held in the annular groove. The leads of the electric coil 5 extend through the clutch driving gear 3 in the direction of the shaft 4 respectively, and are respectively connected with brushes which are situated on the bottom of the gear 3 as viewed in FIG. 3 facing of the printed circuit substrate 15 and contacting two electrically conductive rings on the printed circuit substrate respectively. One of the electric rings is connected to the positive pole of the power supply and the other ring is connected to the negative pole of the power supply. When an electric current flows through the electric coil 5, a magnetic field occurs about the electric coil 5.

A magnetic disk 6 faces the upper end face of the clutch driving gear 3. The disk 6 is movably supported on a clutch driven gear 8 by a plate spring 7 and is constantly acted upon by an upward pulling force of the plate spring 7. Several pins 3a are located in a circle on the upper surface of the clutch driving gear 3 and several complementary holes 6a arranged in a circle on the lower surface of the disk 6 facing the circle on the upper surface of gear 3 are adapted to receive respective pins 3a. As mentioned above, when a current flows through the electric coil 5, a magnetic flux occurs on the upper surface of the clutch driving gear 3 which opposed the upward pulling force of the plate spring 7 so that the disk 6 is attracted towards the upper surface of the clutch driving gear 3. As the clutch driving gear 3 rotates, the pins 3a match the holes 6a and the disk 6 move further down, whereby the pins 3a are inserted into the holes 6a and the disk 6 is driven by the clutch driving gear 3 in the same direction of rotation as the clutch driving gear 3.

Rivets 6b which connect the spring 7 and the disk 6 extend into notches in the flange of a gear 8 such that these rivets 6b always maintain engagement with the notches in the flange of gear 8 whether the disk 6 is situated in the upper disengaged position (shown in FIG. 3) or the disk 6 is in the engaged position. Therefore, if the disk 6 rotates positively or negatively, the gear 8 will also rotate positively or negatively.

A first gear sector 11, which is fixed to output shaft 12, engages with the gear 8. The output shaft 12 is supported by a retainer 31 through two bearings 33 and 34.

As shown in FIG. 3 and FIG. 4, the retainer 31 comprises a first ring part 31a supporting the bearing 33, a second ring part 31b supporting the bearing 34, and a stem part 31c supporting a plate 32 which is fixed to a potentiometer 35. The retainer 31 is pressed into a hole in the gear housing 21 and integrated with it.

A second gear sector 13 is fixed on the lower part of the output shaft 12 inside the gear housing 21, and engages with a pinion gear 14 which is fixed on the rotatable shaft of potentiometer 35, which is fixed to plate 32 by means of a set screw 36.

Figure 5:
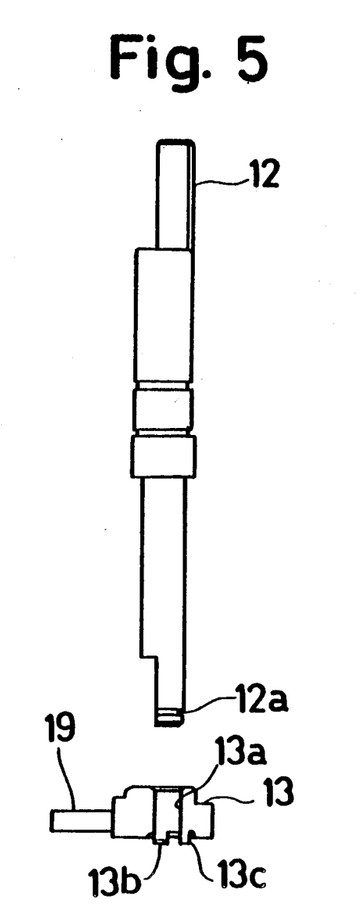
FIG. 5 is an exploded view showing how the output axle 12 shown in FIG. 2 and the second gear sector 13 illustrated in FIG. 3 are oriented prior to connection.
Figure 6:
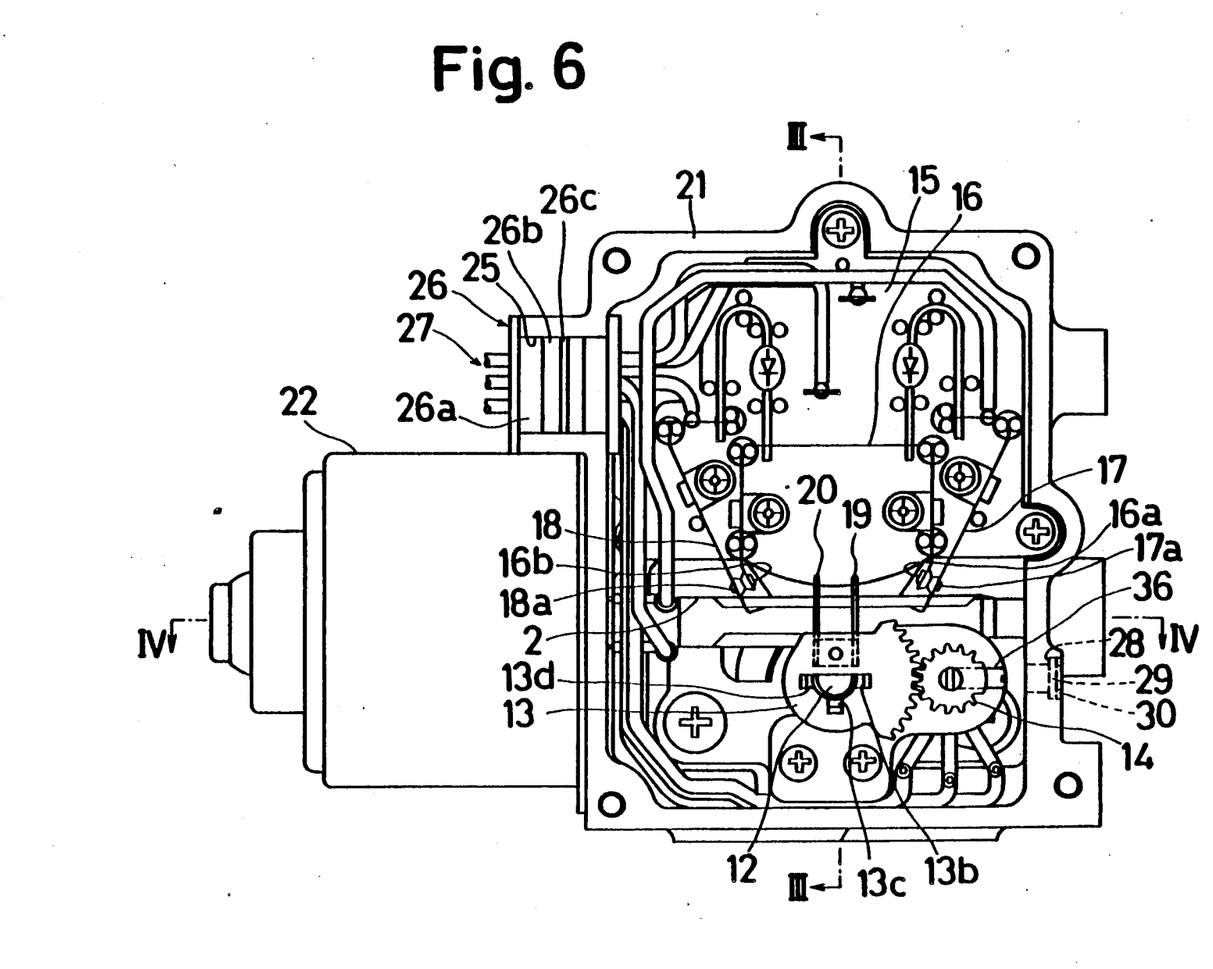
FIG. 6 is a bottom view of the open end of the gear housing 21, with the cover plate 24 and the gasket 23 removed.

FIG. 5 is an exploded view showing the second gear sector 13 disassembled from the output shaft 12 and FIG. 6 shows the lower surface of the reduction gear mechanism with the cover plate 24 and the gasket 23 disassembled from the opening of the gear housing 21. As shown in FIG. 6, the second fan shaped gear sector 13 is made of synthetic resin, and the parallel arms 19 and 20 at one side of the gear sector 13 are embedded in the synthetic resin when the gear sector 13 was made. The lower end of the output shaft 12 is flattened and one side of the hole 13a is flattened corresponding to the lower end of the output shaft 12 and the lower end of the output shaft 12 extends through the hole 13a. A ring groove 12a is cut on the lower end of the output shaft 12. On the second gear sector 13, three claws 13b–13d entering the groove 12a are made of synthetic resin and are integrated so that they are situated at the rim of the openings of the lower part of the hole 13a and point toward the center of the hole 13a. FIG. 5 shows that when the lower end of the output shaft 12 is pressed into the hole 13a of the second gear sector 13 and then pulled out, the claws 13b–13d go together towards the output shaft. As soon as the ring groove 12a of the output shaft 12 faces the claws 13b–13d, the claws 13b–13d enter into the inside of the groove 12a. The claws 13b–13d remain in the inside of the groove 12a when the second gear sector 13 is fixed to the output axle 12. The output axle 12 is supported by the retainer 31 and held in the gear housing 21, as shown in FIG. 4 and FIG. 6.

FIG. 6 shows a conductor plate 16 at the ends of which are contact elements 16a and 16b, a second conductor plate 17 and a third conductor plate 18 fixed to a printed circuit substrate 15. A contact element 17a of the second conductor plate 17 contacts the contact element 16a of the first conductor plate 16 and the contact element 18a of the third conductor plate 18 contacts the contact element 16b of the first conductor plate 16. The output shaft 12 is located midway between the contact elements 17a and 18a.

By means of the printed circuit on the printed circuit substrate 15 and the electric lead 27 which is connected to the printed circuit substrate 15 and a controller switch other than the reduction gear mechanism, as soon as the electric coil 5 is energized, that is, the first conductor plate 16 is connected to positive pole of the power supply and the second conductor plate 17 is connected to negative pole, the electric current that makes the electric motor 1 rotate positively flows through the electric circuit on the printed circuit substrate 15, the electric motor 1 rotates positively, the work gear 2 rotates positively, the clutch driving gear 3 rotates positively, the pins 3a of the gear 3 enter the holes 6a of the disk 6, and the disk 6 rotates positively. Hence the clutch gear 8 rotates the first gear sector 11 and the output shaft 12 positively. Then the second gear sector 13 rotates positively in a clockwise direction as viewed in FIG. 6, the pinion gear 14 rotates positively, and the slider of the potentiometer 35 rotates positively. When this happens, the arm 19 contacts the end part of the second conductor plate 17 and it is driven to move towards the right as viewed in FIG. 6. Hence, as the positive rotation takes place, the contact part 17a leaves the contact part 16a, and the electrical connection between the first conductor plate 16 and the second conductor plate 17 is turned off so that the motor 1 stops running and the output shaft 12 stops rotating.

By means of the electric circuit on the printed circuit substrate 15, the electric lead 27 connected to the printed circuit substrate and the controller switch as soon as the electric coil 5 is energized, that is, the first conductor plate 16 is connected to the positive pole of the power supply and the third conductor plate 18 is connected to the positive pole of the power supply, the electric current that makes the motor 1 rotate negatively flows through the circuit on the printed circuit substrate 15, the electric motor 1 rotates negatively, the work gear 2 rotates negatively, the clutch driving gear 3 rotates negatively, the pins 3a of the gear 3 enter into the holes 6a in the disk 6, and the disk 6 rotates negatively. Hence the clutch gear 8 rotates negatively, the first fan shaped gear sector 11 rotates negatively, and the output shaft 12 rotates negatively. Then the second fan shaped gear sector 13 rotates negatively, i.e. in counter-clockwise direction in FIG. 6, the pinion gear 14 rotates negatively, and the slider of the potentiometer 35 rotates negatively. When this happens, the arm 20 contacts the end part of the third conductor plate 18 and is driven to move towards the left of FIG. 6. Hence as the negative rotation described above takes place, the contact element 18a leaves the contact element 16b, the electric connection between the first conductor plate 16 and the third conductor plate 18 is broken. Then the electric motor 1 stops running and the output shaft 12 stops rotating.

The first, second and third conductor plates 16–18 and the contact elements 16a, 16b, 17a, and 18a fixed on them have the function of limit switches for positive and negative rotation.

The potentiometer 35 is connected with the circuit on the printed circuit substrate 15. By means of the circuit 15 and the electric leads 27 connected to the circuit, the controller receives a signal which shows the voltage of the potentiometer 35, that is, the rotational angle or position of rotation of the output shaft 12.

The electric leads 27 connected to the circuit on the printed substrate 15 are gripped and held by the grommet 26 which is pressed into the rectangular opening 25 of the gear housing 21 (see FIG. 6). The rectangular opening 25 is situated at the open end of the gear housing 21 and is closed by the cover plate 24 (see FIG. 1) with the waterproof and airproof gasket 23 being set at the opening. The grommet 26 is essentially pressed with high pressure by the gasket 23, is compressed, and does not contact the cover plate 24. On the other hand, because of the cover plate 24, the pressure of the part of the gasket 23 that contacts the grommet 26 is not high enough. Therefore, the airtightness between the cover plate 24 and the part of the gasket 23 at the upper part of the grommet 26 decreases. To prevent this from occurring, a shallow groove 26a is made on the grommet 26 facing the gasket 23. An airtight platform 26b connecting with the groove 26a is a little thicker than it and a convex strip 26c is formed on the airtight platform 26b.

Figure 7:
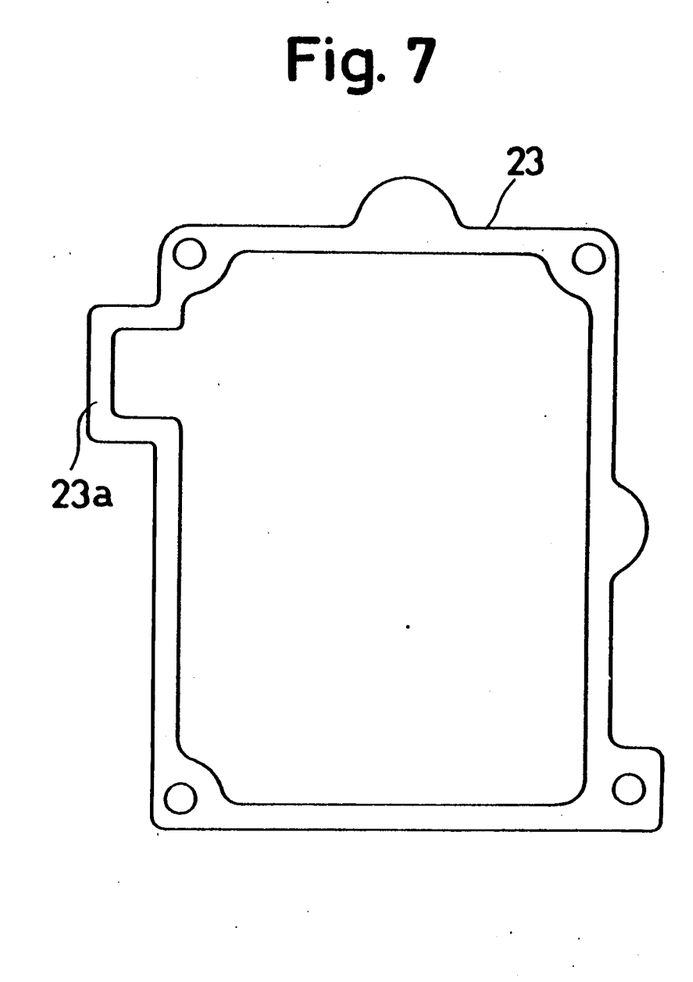
FIG. 7 is a plan view of the gasket 23 shown in FIG. 2.

FIG. 7 shows the gasket 23 which seals the opening of the gear housing 21 in an airtight manner. The gasket 23 is set on the end of opening of the gear housing 21 shown in FIG. 6, thus the part 23a of the gasket 23 facing the grommet is on the groove 26a of the grommet 26. In such a way the cover plate 24 is laid on the gasket 23. Four screws are inserted through the holes of the cover plate 24 and gasket 23, and screwed to the gear housing 21. Hence the convex strip 26c of the grommet 26 on the airtight platform 26b is pressed by the cover plate 24, and the gear housing 21 is closed airtightly.

In addition, a sealing material 37 (see FIG. 3 and FIG. 4) is inserted between the output shaft 12 and the gear housing 21 and the rubber sealing material 38 is placed between the motor case 22 and the gear housing 21 (see FIG. 4).

When the parallel arms 19 and 20 (shown in FIG. 6) are perpendicular to the worm 2, the mechanical parts mentioned above are in a middle position and although the potentiometer 35 is so designed that its voltage at this very time is in the middle of its range of voltage, when the assembling of gear reduction mechanism is completed, the voltage of the potentiometer 35 corresponds to the middle position of the mechanism and a deviation from the standard middle level may occur. For this reason, the pinion gear 14 is fixed on the rotatable shaft of the potentiometer 35 by a set screw 36. As the set screw 36 is perpendicular to the inner surface of the gear housing 21 (see FIG. 4 and FIG. 6), the hole 28 through which the screw driver can be inserted is located on the gear housing 21 facing the outer end of the set screw 36. The part of the hole 28 near the inside of the housing has a small diameter and the part near the outside has a larger diameter. A filter 29 is inserted into the end of the larger diameter part and pressed by the ring 30 so that dust, water, and liquid cannot essentially flow through the larger diameter part of the hole while the filter 29 permits the gas to flow through. After the filter 29 has been fixed, in order to adjust the voltage level of the potentiometer 35 corresponding to the rotation angle of the output shaft 12, the procedures are as the following: remove the ring 30 and the filter 29 from the hole 28, disconnect the electric coil 5, impose a force from the outside on the output shaft 12 to make it rotate, locate the set screw 36 facing the hole 28, insert the top of a screw driver into the hole 28 and loosen the screw 36, rotate the output shaft 12 until the rotation angle corresponds to the voltage of the potentiometer 35, then screw the lock screw 36 firmly and finally insert the filter 29 and the ring 30 back into the hole 28.

As mentioned above, the gear housing 21 is sealed tightly by the cover plate 24 with the gasket 23. Although the inner space of the gear housing 21 and the inner space of the motor case 22 are insulated from each other, heat arising from the electric motor 1 may be transferred into the gear housing 21 through the worm gear 2 and the motor casing 22. Since the temperature outside the gear housing 21 might be high due to the proximity of the gear housing to the engine, the temperature of the inner space of the gear housing 21 will rise, the inner pressure of the gear housing 21 becomes higher, and the inside air exits through some cracks. When the temperature of the gear housing 21 falls, the inner pressure becomes lower and the outside air enters the gear housing 21 through the same cracks. When it just happens that there exists some water and dust in these cracks, they will enter together with the outside air and cause the metal in the gear housing 21 to rust, increase the friction of the moving mechanism, and make the electric contactors contact each other badly or render the contactors inseparable. In the case of the gear reduction mechanism described above, there is the hole 28 opening through the gear housing 21. Because the hole is blocked with the filter 29 which can prevent dust and water from coming in, actually flowing liquid can be cut off, even though gasses can go through it, that is, air can go out from the gear housing 21 and come in from the outside while water and dust are prevented from entering the gear housing 21.

Figure 8:
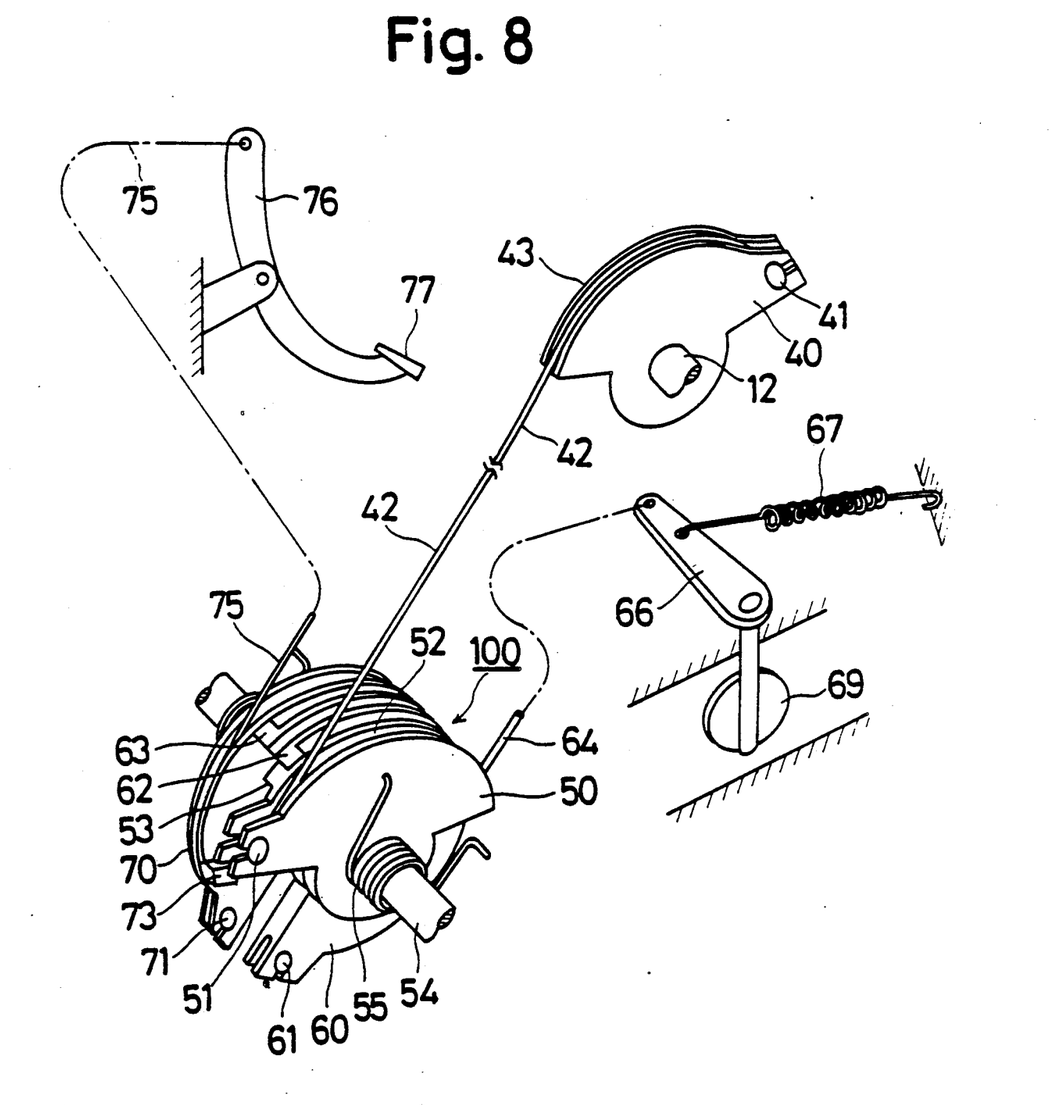
FIG. 8 is a schematic perspective view showing the driving mechanism of the throttle valve of the vehicle engine which is driven by the output axle 12 of the electrically operated gear reduction mechanism.

The following describes the working state of the electric gear reduction mechanism with reference to FIG. 8. FIG. 8 shows the open-close control mechanism for a throttle valve 69 of an internal combustion engine. The mechanism can be opened and closed both automatically and by foot pressure. The output shaft 12 of the electric gear reduction mechanism rotates to drive a cam sector 40 rotatably as shown in FIG. 8 and this means that the output shaft 12 of the electric gear reduction mechanism is fixed to the cam sector 40.

A wire guiding groove 43 is cut on the circumferential face of the cam sector 40 and a wire 42 is inserted in the groove. One end of the wire 42 is fixed on a pin 41. As the output shaft 12 rotates in the clockwise direction of FIG. 8, the cam sector 40 rotates in the same direction and the wire 42 is pulled towards the cam sector 40.

Another end of the wire 42 is fixed to a pin 51 which is fixed on a first cam sector 50 of an assembly 100. The cam sector 50 is mounted freely for rotation on a stationary axle 54 and is subjected to a torque in the counter clockwise direction by a coil spring 55 having one end fixed to the cam sector 50 and another end fixed to the mechanical frame of the assembly 100. The mechanical frame is not shown in FIG. 8.

The first cam sector 50 is next to a second cam sector 60, and a third cam sector 70 is next to the second cam sector 60. The cams 60 and 70 are also mounted freely for rotation on the stationary axle 54. The third cam sector 70 is also acted upon with a counter-clockwise torque by a coil spring 75 having one end fixed to the cam 70 and another end fixed to the mechanical frame of the assembly 100. The mechanical frame is not shown in FIG. 8.

One end of wire 64 is connected to a driving lever 66 for the throttle valve and the other end is fixed to the second cam sector 60 by a pin 61. One end of wire 75 is connected to an end 76 of an accelerator pedal 77 and the other end is fixed to the third cam sector 70 by a pin 71.

Although the first to the third cam sectors 50-70 approximately have the same structure as the cam sector 40 described earlier, there are still some differences from the cam sector 40 in the following aspects. There is a protuberance 53 at the end of the first cam sector 50, there is a protuberance 73 at the end of the third cam sector 70 and at the end of the second cam sector 60, there are protuberances 62 and 63 which contact protuberances 53 and 73.

FIG. 8 shows a state where the accelerator pedal 77 is free (is not stepped on) and the output shaft 12 has rotated to the upper limit position (the position that the contactor 17a has left the contactor 16a) corresponding to the maximum opening of the throttle valve 69. The second cam sector 60 is acted upon by a counter clockwise torque by the pulling force of a coil spring 67 which drives the throttle valve lever 66 to move in the turn-off direction with the help of the wire 64. By means of the cam sector 40 and the wire 42, the rotation of the output shaft 12 causes the first cam sector 50 to rotate clockwise, hence, the protuberance 62 on the first cam sector 50 contacts the protuberance 62 on the second cam sector 60, and the second cam sector 60 rotates clockwise resisting the pulling force of the coil spring 67 until the upper limit position corresponding to the maximum opening of the throttle valve is reached.

As the output shaft rotates towards the lower limit position, the cam sector 40 rotates counter-clockwise and the wire 42 is paid out, that is to say, the pulling force acting on the wire 42 disappears. Together with this, the first cam sector 50 rotates counter clockwise. Under the action of the reacting force of the coil spring 55, the protuberance 53 of the cam sector 50 moves counter-clockwise away from the protuberance 62 of the second cam sector 60. Since the second cam sector 60 rotates counter-clockwise under the action of the pulling force of the pulling coil spring 67, as the output shaft 12 rotates toward the lower limit position, the first and the second cam sectors 50 and 60 will both rotate counter-clockwise with the protuberance 62 contacting the protuberance 53 and the throttle valve 69 will rotate counter-clockwise toward the idling position away from the maximum opening.

As shown in FIG. 8, when the output shaft 12 drives the throttle valve 69 to the maximum opening (the upper limit position) when the pedal 77 is stepped on, the third cam sector 70 rotates clockwise with the help of the wire 75. The protuberance 73 of the cam sector 70 won't contact the protuberance 63 of the second cam sector 60 until the accelerator pedal 77 is pressed to the maximum.

Assuming that the output shaft 12 rotates backward from the maximum opening (the upper limit position) shown in FIG. 8 toward the idling opening (the lower limit position) and the accelerator pedal 77 is stepped onto the position corresponding to the middle opening, the protuberance 63 of the second cam sector 60 will contact the protuberance 73 of the third cam sector 70, and the counter-clockwise rotation is hindered. For this reason, the throttle valve 69 will be in the middle opening position.

In summary, when the accelerator pedal 77 is free, the rotation position of the output shaft 12 corresponds to the throttle opening. If the desired throttle opening is greater than the throttle opening determined by the rotation position of the output shaft 12, as the accelerator pedal 77 is pressed down the throttle opening is determined by the movement of the accelerator pedal 77. If the output shaft 12 rotates to the lower limit position, the throttle opening is determined by the movement of the pedal. When the desired throttle opening is greater than the throttle opening corresponding to the movement of the accelerator pedal, the throttle opening is determined by the rotation position of the output shaft 12. Therefore, the constant running of the vehicle is not controlled if the output shaft 12 returns to the lower limit position and the opening of the throttle valve 69 corresponds to the movement of the accelerator pedal 77.

The following is to summarily illustrate the characteristics of the gear reduction mechanism of the present invention.

The output shaft 12 supported by two bearings 33 and 34 can rotate freely. The two bearings 33 and 34 are supported by one retainer 31 pressed into the gear housing 21. When the two bearings 33 and 34 fixed on the output shaft 12 are pressed into the retainer 31, the mounting of the output axle 12 is essentially completed. It is easier to correctly locate and make the holes for two bearings in one retainer 31 to have them properly aligned. In the prior art, the holes for the bearings were made in different parts respectively. Because of the combination of the parts and the mechanical errors in assembling the parts on to a third part, it was easier to cause center deviation. These problems have been overcome by the present invention.

In addition, by means of the plate 32, the potentiometer 35 is supported by the retainer 31. The second gear sector 13 of the output shaft 12 is supported by the retainer 31 and engages the pinion gear 14 fixed on the rotation axle of the potentiometer 35. An electric signal expressing the rotation angle of the output shaft 12 is obtained from the potentiometer 35 since the output shaft 12 and the potentiometer 35 which contacts the output shaft 12 through a gear are supported by the same retainer 31. Thus, any gear connection error of the output shaft 12 with the potentiometer 35, any mechanical error or assembly error are reduced and the assembling of the gear mechanism is easier to handle.

The second gear sector 13 fixed on output shaft 12 and the claws 13b-13d pointing toward the hole 13a are made of synthetic resins and integrated together. Because the claws 13b-13d are made in such a way that they contact the ring groove 12a at the end of the output shaft 12, by pressing the end of the output shaft 12 into the axial hole 13a of the second gear sector 13, the second gear sector 13 automatically contacts the output shaft 12. In order to contact a shaft precisely, according to the usual technology, it was necessary to press an E-type ring or C-type ring into the ring groove situating at the end of the axles which is to be inserted through the hole of the gear. In the present invention, this procedure is omitted and the E-type ring and the C-type ring are also omitted.

In order to compactly hold the gear mechanism and the printed circuit substrate 15 in the gear housing 21 and to make the assembling of the grommet 26 relative to the gear housing 21 easier, the opening 25 is provided to receive the grommet 20 so that it is pressed by the gear housing 21 and the cover plate 24. In order to seal the inner space of the gear housing 21, a gasket 23 is inserted between the gear housing 21 and the cover plate 24. Because the grommet 26 is pressed by the gasket 23, the grommet 26 does not contact the cover plate and because of the elastic force of the grommet 26, the gasket 23 is not pressed efficiently enough by the cover 24. Therefore, the sealing connection between the cover plate 24 and the part 23a of the gasket 23 is not perfect. To prevent this from occurring, a shallow groove 26a is made on the surface of the grommet 26 facing the part 23a of the gasket 23. The part 23a of the gasket 23 facing the grommet is directly contacted by the grommet 26. The grommet 26 is pressed by the cover plate 24 by the convex strip 26b to assure an airtight connection.

The electric signal of the potentiometer 35 corresponds to the rotation angle of the output shaft 12. In order to adjust the rotation angle of the shaft of the potentiometer 35, its relative relation, and finally the relation between the rotation angle of the output shaft 12 and the electric signal expressing it, the pinion gear 14 contacting the second gear sector 13 of the output shaft 12 is fixed on the rotation axle of the potentiometer 35 by a set screw 36, and the relative relation can be adjusted by loosening the set screw 36. A screw driver is used to loosen the set screw. It can be done without removing the cover plate 24 from the gear housing 21 or without disassembling the gear reduction mechanism. In order to do this easily, the hole 28 is used to insert the screw driver. Because of the inner positive or negative pressure arising from the temperature changes of the gear reduction mechanism, it is possible to exchange the air between the inside and the outside through the hole 28. The hole 28 makes air passage through other sealed places impossible and prevents water and dust from entering the inside through such other sealed places. To prevent water and dust from entering the inside of the gear housing 21 through the hole 28, the hole 28 is sealed by the filter 29 which does not permit liquid but allows air to go through. Therefore, the air flow takes place by means of the filter 29 and does not occur at the sealed parts. Water and dust cannot enter the inside of the gear housing 21.

As mentioned above, the present invention relates to a gear reduction mechanism equipped with housing 21, gear 11 and rotation shaft 12 on which the gear 11 is fixed. The rotation shaft 12 is mounted by at least two bearings 33, 34 which are pressed into the holes 31a and 31b corresponding to the bearings of retainer 31 and mounted by the retainer 31. The retainer 31 is fixed on the housing.

While the invention has been particularly shown and described with reference to preferred embodiments thereof, it will be understood by those in the art that the foregoing and other changes in form and details may be made therein without departing from the spirit and scope of the invention.

What is claimed is:
1. A gear reduction mechanism comprising:
a housing;
a rotatable shaft having a gear firmly fixed thereto;
at least two bearings supporting said rotatable shaft;
retainer means secured to said housing and supporting said bearings which are pressed into holes in said retainer means corresponding to said bearings, said retainer means comprising a single, one-piece retainer having a pair of coaxial, spaced apart holes formed therein for receiving said bearings;
a support plate secured to one end of said retainer, a potentiometer having an axle parallel to said shaft mounted on said support plate and gear means on said shaft and said axle disposed in engagement to transmit rotation of said shaft to said potentiometer to provide an output signal indicative of the angular position of said shaft;
adjustable means for adjustably positioning said gear means relative to each other; and
vent hole means in said housing in alignment with said adjustable means and filter means removably mounted in said vent hole means to permit adjustment of said adjustable means from the exterior of said housing.

* * * * *